US010507816B2

(12) United States Patent
Kilmurray et al.

(10) Patent No.: US 10,507,816 B2
(45) Date of Patent: Dec. 17, 2019

(54) BRAKE-BY-WIRE SYSTEM

(71) Applicant: GM Global Technology Operations LLC, Detroit, MI (US)

(72) Inventors: Paul A. Kilmurray, Wixom, MI (US); Eric E. Krueger, Chelsea, MI (US); Brandon C. Pennala, Howell, MI (US); Christopher C. Chappell, Commerce Township, MI (US); Alan J. Houtman, Milford, MI (US); Kevin S. Kidston, New Hudson, MI (US); Patrick J. Monsere, Highland, MI (US); Michael C. Roberts, Auburn Hills, MI (US); Steven J. Weber, Mount Clemens, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 15/251,860

(22) Filed: Aug. 30, 2016

(65) Prior Publication Data

US 2018/0056962 A1 Mar. 1, 2018

(51) Int. Cl.
*B60T 13/74* (2006.01)
*B60T 17/18* (2006.01)
(Continued)

(52) U.S. Cl.
CPC ............ *B60T 13/741* (2013.01); *B60T 7/042* (2013.01); *B60T 17/18* (2013.01); *B60T 17/22* (2013.01);
(Continued)

(58) Field of Classification Search
CPC ......... B60T 2270/404; B60T 2270/402; B60T 2270/82; B60T 17/18; B60T 17/22;
(Continued)

(56) References Cited

U.S. PATENT DOCUMENTS 4,359,125 A * 11/1982 Shinoda ................ F02D 31/002
123/352
4,664,218 A * 5/1987 Graham .................. B60T 7/122
180/272

(Continued)

FOREIGN PATENT DOCUMENTS

CN 101708717 A 5/2010
CN 101708718 A 5/2010

OTHER PUBLICATIONS

Office Action for Chinese Application No. 201710726973.7; Application Filing Date Aug. 22, 2017; dated Sep. 4, 2019 (16 pages).

*Primary Examiner* — Bradley T King
*Assistant Examiner* — Mahbubur Rashid
(74) *Attorney, Agent, or Firm* — Cantor Colburn LLP

(57) ABSTRACT

A vehicle with a fault tolerant electronic brake-by-wire (BBW) system includes a plurality of brake assemblies that control braking of a respective wheel of the vehicle. The brake assemblies include a first brake assembly and a second brake assembly. The first brake assembly is integrated with at least one enhanced brake actuator assembly including a first electronic actuator driver circuit in signal communication with a first electro-mechanical actuator. The first brake assembly is configured to adjust a brake force applied to a first wheel of the vehicle. The second brake assembly is integrated with at least one enhanced smart brake actuator assembly including a first actuator controller in signal communication with a second electronic actuator driver circuit. The second electronic actuator driver circuit is in signal communication with a second electro-mechanical actuator that is configured to adjust a brake force applied to a second wheel of the vehicle.

8 Claims, 4 Drawing Sheets

(51) Int. Cl.
   *B60T 17/22* (2006.01)
   *B60T 7/04* (2006.01)
(52) U.S. Cl.
   CPC ..... *B60T 2270/40* (2013.01); *B60T 2270/402* (2013.01); *B60T 2270/404* (2013.01); *B60T 2270/414* (2013.01); *B60T 2270/415* (2013.01); *B60T 2270/82* (2013.01)
(58) Field of Classification Search
   CPC ......... B60T 2270/414; B60T 2270/403; B60T 2270/415
   USPC ........................................................ 303/122
   See application file for complete search history.

(56) References Cited

U.S. PATENT DOCUMENTS

| | | | | |
|---|---|---|---|---|
| 4,701,854 | A * | 10/1987 | Matsuda | B60T 8/885 303/113.1 |
| 4,852,699 | A * | 8/1989 | Karnopp | B60T 13/741 188/162 |
| 5,255,962 | A * | 10/1993 | Neuhaus | B60T 8/175 303/188 |
| 5,579,219 | A * | 11/1996 | Mori | G05B 19/0421 700/4 |
| 5,829,557 | A * | 11/1998 | Halasy-Wimmer | B60T 13/741 188/162 |
| 5,941,612 | A * | 8/1999 | Carpenter | B60T 8/885 303/122 |
| 6,030,054 | A | 2/2000 | Doericht | |
| 6,188,947 | B1 * | 2/2001 | Zhan | B60T 8/4059 303/11 |
| 6,203,116 | B1 * | 3/2001 | Dieckmann | B60T 8/885 303/122 |
| 6,354,671 | B1 * | 3/2002 | Feldmann | B60T 7/042 303/15 |
| 6,984,001 | B2 * | 1/2006 | Nilsson | B60T 8/885 303/122 |
| 7,215,090 | B2 * | 5/2007 | Kuramochi | H02P 3/04 188/158 |
| 7,359,786 | B2 * | 4/2008 | Lindqvist | B60T 8/1708 303/122 |
| 7,484,815 | B2 * | 2/2009 | Ogawa | B60T 8/261 303/113.4 |
| 7,837,278 | B2 * | 11/2010 | Nilsson | B60T 8/321 188/158 |
| 8,682,559 | B2 * | 3/2014 | Kolbe | B60T 8/17616 701/1 |
| 8,775,046 | B2 * | 7/2014 | Kaster | B60T 7/042 303/113.1 |
| 2005/0127749 | A1 * | 6/2005 | Hartmann | B60T 13/741 303/122 |
| 2005/0165531 | A1 | 7/2005 | Nilsson et al. | |
| 2006/0131953 | A1 * | 6/2006 | Nakayama | B60T 7/042 303/122 |
| 2007/0114843 | A1 * | 5/2007 | Kawahara | B60T 7/12 303/122 |
| 2008/0154443 | A1 * | 6/2008 | Godo | B60T 13/662 701/3 |
| 2008/0236964 | A1 | 10/2008 | Kikuchi et al. | |
| 2011/0168504 | A1 * | 7/2011 | Lee | B60T 7/107 188/106 P |
| 2015/0108929 | A1 * | 4/2015 | Nobe | H02P 6/085 318/400.3 |
| 2015/0114343 | A1 * | 4/2015 | Bernier | F02D 9/02 123/337 |

* cited by examiner

BRAKE-BY-WIRE SYSTEM

FIELD OF THE INVENTION

The invention disclosed herein relates generally to vehicle braking systems and, more particularly, to a vehicle including a brake-by-wire (BBW) system.

BACKGROUND

Current industrial automotive trends to reduce the number of overall mechanical components of the vehicle and to reduce the overall vehicle weight have contributed to the development of system-by-wire applications, which are typically referred to as X-by-wire systems. One such X-by-wire system that has received increased attention is a brake-by-wire (BBW) system, sometimes referred to as an electronic braking system (EBS).

Unlike conventional mechanical braking systems, BBW systems actuate one or more vehicle braking components via an electronic signal that is generated by an on-board processor/controller. In some systems, a BBW system is implemented by supplanting a conventional hydraulic fluid-based service braking system with an electrical-based system to perform basic braking functions. The electrical-based systems implemented in a conventional BBW system include brake assemblies with an electronic brake actuator such as, for example, an electronically-controlled brake caliper typically referred to as an "e-caliper". Conventional e-calipers exclude any control logic, and merely operate in response to current generated by a single power source located externally from the brake assembly and at a remote area of the vehicle.

Since BBW systems typically remove any direct mechanical linkages and/or hydraulic force-transmitting-paths between the vehicle operator and the brake control units, much attention has been given to designing BBW control systems and control architectures that ensure reliable and robust operation. Various design techniques have been implemented to promote the reliability of the BBW system including, for example, redundancy, fault tolerance to undesired events (e.g., events affecting control signals, data, hardware, software or other elements of such systems), fault monitoring, and recovery.

SUMMARY

At least one non-limiting embodiment provides a vehicle with a fault tolerant electronic BBW system including a plurality of brake assemblies that control braking of a respective wheel of the vehicle. The brake assemblies include a first brake assembly and a second brake assembly. The first brake assembly is integrated with at least one enhanced brake actuator assembly including a first electronic actuator driver circuit in signal communication with a first electro-mechanical actuator. The first brake assembly is configured to adjust a brake force applied to a first wheel of the vehicle. The second brake assembly is integrated with at least one enhanced smart brake actuator assembly that includes a first actuator controller in signal communication with a second electronic actuator driver circuit. The second electronic actuator driver circuit is in signal communication with a second electro-mechanical actuator that is configured to adjust a brake force applied to a second wheel of the vehicle.

According to another non-limiting embodiment, a vehicle includes a fault tolerant electronic BBW system. The vehicle comprises a plurality of brake assemblies configured to control braking of a respective wheel of the vehicle. The plurality of brake assemblies comprises a first group of brake assemblies and a second group of brake assembly. Each brake assembly of the first group is integrated with an electronic enhanced brake actuator assembly. Each brake assembly of the second group is integrated with an electronic enhanced smart brake actuator assembly that includes an electronic actuator controller. Each of the enhanced brake actuator assemblies of the first group excludes an electronic actuator controller. The enhanced smart brake actuator assemblies electrically control a respective brake assembly integrated therewith and also at least one enhanced brake actuator assembly included in the first group of brake assemblies.

According to yet another non-limiting embodiment, a method of controlling a fault tolerant BBW system comprises integrating in a first brake assembly an enhanced smart brake actuator assembly including an electronic actuator controller, and integrating in a second brake assembly an enhanced brake actuator assembly that excludes the electronic actuator controller. The method further includes outputting via the electronic actuator controller at least one data command signal that controls braking of a first wheel coupled to the first brake assembly and braking of a second wheel coupled to second brake assembly.

The above features and advantages of the invention are readily apparent from the following detailed description of the invention when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
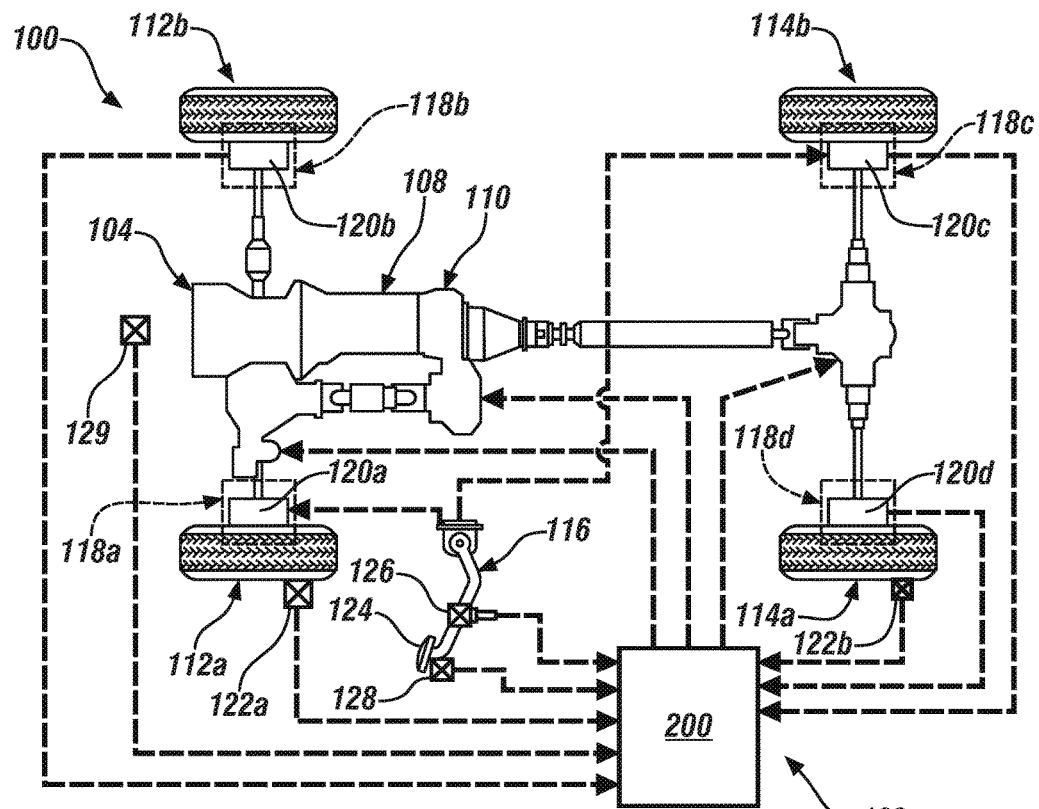
FIG. 1 is a top schematic view of a vehicle including a fault tolerant BBW system in accordance with a non-limiting embodiment.

The following description is merely exemplary in nature and is not intended to limit the present disclosure, its application, or uses. It should be understood that throughout the drawings, corresponding reference numerals indicate like or corresponding parts and features.

Various non-limiting embodiments provide a BBW system including an "enhanced smart" brake actuator assembly and an "enhanced" brake actuator assembly. The enhanced smart brake actuator assembly and the enhanced brake actuator assembly both include an electronic actuator driver circuit integrated therewith. The enhanced smart brake actuator assembly, however, includes an actuator controller (which is not included in the enhanced brake actuator assembly). Accordingly, the actuator controller is capable of controlling both the enhanced smart brake actuator assembly and the enhanced brake actuator assembly. Integrating the actuator driver circuit components and the electro-mechanical actuators into a single device also reduces the length and number of high-frequency switched high-power power signals installed in the vehicle. In this manner, the level of unintentional electromagnetic compatibility (EMC) (e.g., generation, propagation and reception of electromagnetic energy) associated with the vehicle can be reduced.

With reference now to FIG. 1, a vehicle 100 including a fault tolerant BBW system 102 configured to electronically control braking of the vehicle 100 is illustrated according to a non-limiting embodiment. The vehicle 100 is driven by a powertrain system that includes an engine 104, a transmission 108 and a transfer case 110. The engine 104 includes, for example, an internal combustion engine that is configured to generate drive torque that drives front wheels 112a and 112b, and rear wheels 114a and 114b using various components of the vehicle driveline. Various types of engines 104 may be employed in the vehicle 100 including, but not limited to a diesel engine, a gasoline engine, an electric motor, and a hybrid-type engine system that combines an engine with an electric motor, for example. The fault tolerant BBW system 102 may also be implemented in a battery electric vehicle including an electric motor without departing from the scope of the invention. The vehicle driveline may be understood to comprise the various powertrain components, excluding the engine 104. According to a non-limiting embodiment, engine drive torque is transferred to the transmission 108 via a rotatable crank shaft (not shown). Thus, the torque supplied to the transmission 108 may be adjusted in various manners including, for example, by controlling operation of the engine 104 as understood by one of ordinary skill in the art.

The fault tolerant BBW system 102 (hereinafter referred to as BBW system 102) comprises a pedal assembly 116, brake assemblies 118a-118d (i.e., brake corner modules), one or more brake actuators 120a-120d, one or more wheel sensors 122a and 122b, and an electronic brake system (EBS) controller 200. In at least one embodiment, the brake actuators 120a-120d include one or more enhanced smart brake actuator assemblies and one or more enhanced brake actuators as discussed in greater detail herein.

The pedal assembly 116 includes a brake pedal 124, a pedal pressure sensor 126, and a pedal travel sensor 128. The pedal assembly 116 can be any combination of hardware and software. For example, the pedal assembly 116 can be a pedal emulator that creates the feel of a conventional brake pedal implemented in a hydraulic braking system. In at least one embodiment, the pedal assembly 116 may be operated exclusively using electronic wiring and hardware controllers executing braking logic software.

A braking distance and/or braking force applied to the brake pedal 124 may be determined based on respective signals output from the pedal pressure sensor 126 and a pedal travel sensor 128 as understood by one of ordinary skill in the art. According to a non-limiting embodiment, the pedal pressure sensor 126 is implemented as a pressure transducer or other suitable pressure sensor configured or adapted to precisely detect, measure, or otherwise determine an applied pressure or force imparted to the brake pedal 124 by an operator of vehicle 100. The pedal travel sensor 128 may be implemented as a pedal position and range sensor configured or adapted to precisely detect, measure, or otherwise determine the relative position and direction of travel of brake pedal 124 along a fixed range of motion when the brake pedal 124 is depressed or actuated.

The measurements or readings obtained by the pedal pressure sensor 126 and the pedal travel sensor 128 are transmittable or communicable as needed for use with one or more braking algorithms and/or logic software stored in memory of an electronic controller. The data from the pedal pressure sensor 126 and/or pedal travel sensor 128 may also be used to calculate, select, and/or otherwise determine a corresponding braking request or braking event in response to the detected and recorded measurements or readings output from the wheel sensors 122a and 122b. Based on the determined braking request or braking event, the EBS controller 200 may perform various braking algorithms, speed calculations, distance-to-brake calculations, etc. In addition, the EBS controller 200 may control various braking mechanisms or systems such as, for example, an electronic emergency brake.

The wheel sensors 122a and 122b may provide various types of vehicle data including, but not limited to, speed, acceleration, deceleration, and vehicle angle with respect to the ground, and wheel slippage. In at least one embodiment, the BBW system 102 may include one or more object detection sensors 129 disposed at various locations of the vehicle 100. The object detection sensors 129 are configured to detect the motion and/or existence of various objects surrounding the vehicle including, but not limited to, surrounding vehicles, pedestrians, street signs, and road hazards. The object detection sensors 129 may provide data indicating a scenario (e.g., a request and/or need) to slow down and/or stop the vehicle based on the proximity of one or more objects with respect to the vehicle 100. In response to determining the braking scenario, one or more brake assemblies 118a-118d may be controlled to slow or stop the vehicle 100 as discussed in greater detail herein.

According to at least one embodiment, the BBW system 102 may also include an isolator module (not shown in FIG. 1) and one or more power sources (not shown in FIG. 1). The isolator module may be configured as an electrical circuit and is configured to isolate circuit faults such as wire-to-wire short circuits, for example, that occur on a signaling line circuit (SLC) loop. The isolator module also limits the number of modules or detectors that may be rendered inoperative by a circuit fault on the SLC loop. The circuit fault may include, but is not limited to, a short-circuit, short-to-ground, and over-voltage.

According to a non-limiting embodiment, if a circuit fault occurs, the isolator module may automatically create and open-circuit (disconnect) in the SLC loop so as to isolate the brake assemblies 118a-118d from a circuit fault condition. In addition, if a power source fault occurs, the isolator module may disconnect the faulty power source while maintaining the remaining power sources. In this manner, the BBW system 102, according to a non-limiting embodiment, provides at least one fault tolerant feature, which may allow one or more brake assemblies 118a-118d to continue operating normally in the event a circuit fault condition occurs in the BBW system 102. When the circuit fault condition is removed, the isolator module may automatically reconnect the isolated section of the SLC loop, e.g., the brake assemblies 118a-118d to the power source.

Figure 2:
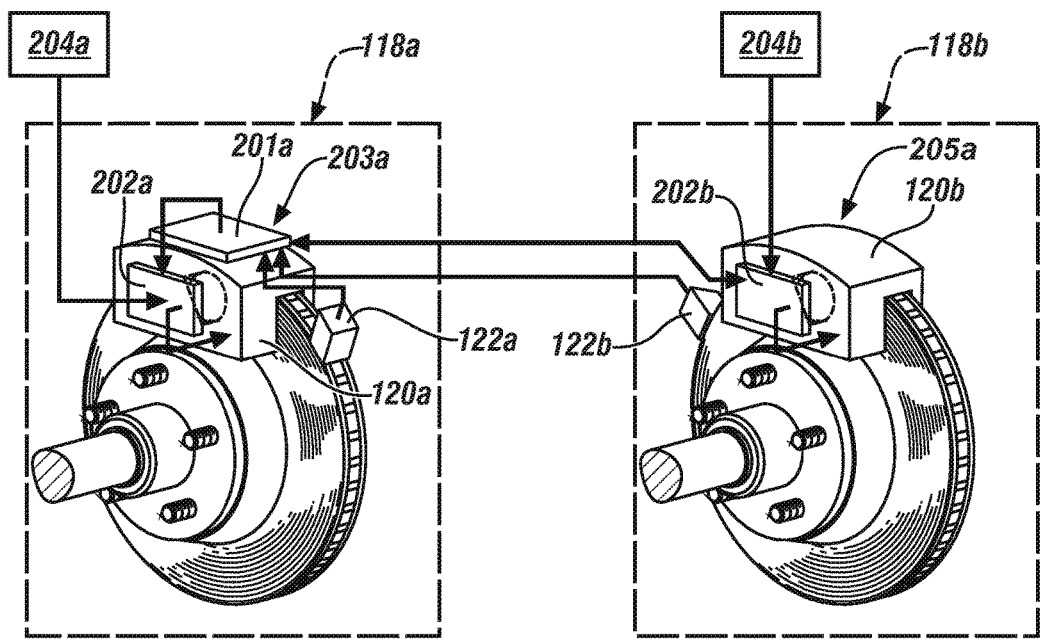
FIG. 2 illustrates a first brake assembly including an enhanced smart brake actuator assembly having an actuator controller in electrical communication with a second brake assembly including an enhanced brake actuator assembly that excludes an actuator controller.

Referring to FIG. 2, an enhanced smart brake actuator assembly 203a is shown in signal communication with an enhanced brake actuator assembly 205a, according to a non-limiting embodiment. Although a single enhanced smart brake actuator assembly 203a and a single enhanced brake actuator assembly 205a are illustrated in FIG. 2, it should be appreciated that the remaining enhanced smart brake actuators units and enhanced brake actuator assemblies units included in the BBW system 102 may operate in a similar manner as described herein.

The enhanced smart brake actuator assembly 203a includes an actuator controller 201a, an electronically controlled actuator 120a such as, for example, an electronic brake caliper (e-caliper) 120a, and an actuator driver circuit 202a such as one or more electronic power circuits 202a. Combining the actuator controller 201a, the actuator 120a, and the actuator driver circuit 202a as a single component offers fast, robust, and diagnosable communication within the brake assembly 118a, while reducing data latency.

The actuator controller 201a selectively outputs a low-power data command signal (e.g., low-power digital signal) in response to one or more braking events. The data command signal may be delivered over a communication interface including, but not limited to, FlexRay™, Ethernet, and a low-power message-based interface such as, for example, a controller area network (CAN) bus. FlexRay™ is a high-speed, fault tolerant time-triggered protocol including both static and dynamic frames. FlexRay™ may support high data rates of up to 10 Mbit/s.

The data command signal initiates the actuator driver circuit 202a integrated with the enhanced smart brake actuator assembly 203a and/or the actuator driver circuit 202b integrated with the enhanced brake actuator assembly 205a. In this manner, the overall number of components and interconnection complexity of the BBW system 102 are reduced compared to conventional BBW systems. In addition, implementing an actuator driver circuit (e.g., 202a) locally in each respective braking assembly 118a-118d assists in eliminating long-distance high-current switching wires, thereby reducing or even eliminating EMI emissions typically found in conventional BBW systems.

Still referring to FIG. 2, the actuator controller 201a includes programmable memory (not shown in FIG. 1) and a microprocessor (not shown). The programmable memory may store flashable software to provide flexibility for production implementation. In this manner, the actuator controller 201a is capable of rapidly executing the necessary control logic for implementing and controlling the actuator driver circuits 202a and 202b (e.g., power circuits) using a brake pedal transition logic method or algorithm which is programmed or stored in memory.

Memory included with the actuator controller 201a may also be preloaded or preprogrammed with one or more braking torque look-up tables (LUTs) (i.e. braking torque data tables, that are readily accessible by the actuator controller 201a in implementing or executing a braking algorithm). In at least one embodiment, the braking torque LUT stores recorded measurements or readings of the pedal assembly 116 and contains an associated commanded braking request appropriate for each of the detected force measurements. In a similar manner, the enhanced smart brake actuator assembly 203a may store a pedal position LUT, which corresponds to the measurements or readings monitored by pedal assembly 116 and contains a commanded braking request appropriate for the detected position of the pedal 124.

The enhanced brake actuator assembly 205a includes an electronically controlled actuator 120b such as, for example, an electronic brake caliper (e-caliper) 120b, and an actuator driver circuit 202b, while excluding an actuator controller similar to the one included in the enhanced smart brake actuator assembly 203a. Accordingly, the actuator driver circuit 202b is controlled by the actuator controller (e.g. 201a) included one or more enhanced smart brake actuator assemblies (e.g., 203a). Therefore, the actuator controller 201a is capable of controlling both the respective enhanced smart brake actuator assembly 203a in which it is installed and also the enhanced brake actuator assembly 205a, as discussed in greater detail herein. Although FIG. 2 illustrates that the enhanced smart brake actuator assembly 203a controls a single enhanced brake actuator assembly 205a, the enhanced smart brake actuator assembly 203a can also control additional enhanced brake actuator assemblies included in the BBW system 102.

Figure 3A:
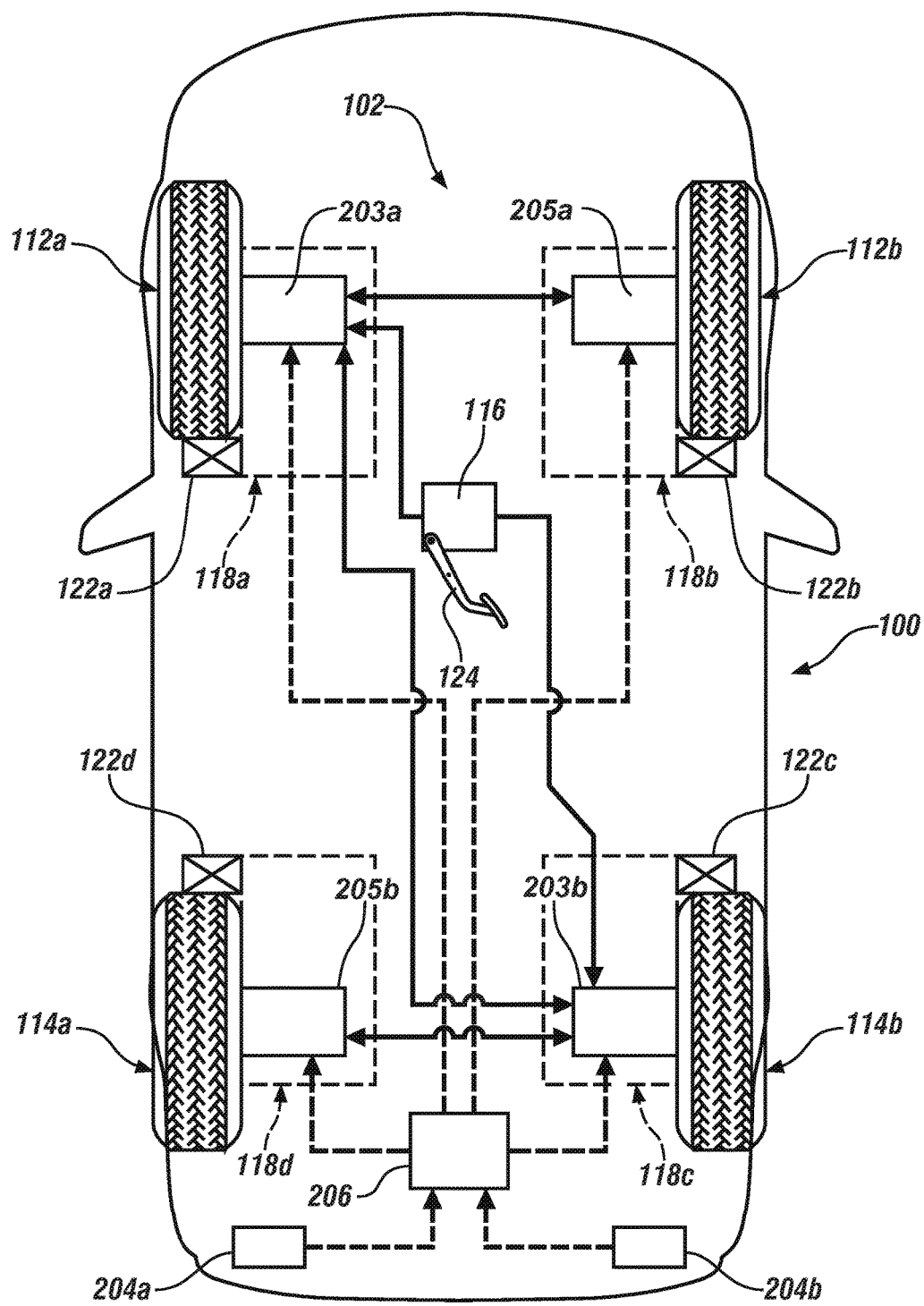
FIG. 3A is a schematic view of a BBW system based on a split EBS controller topology according to a non-limiting embodiment.
Figure 3B:
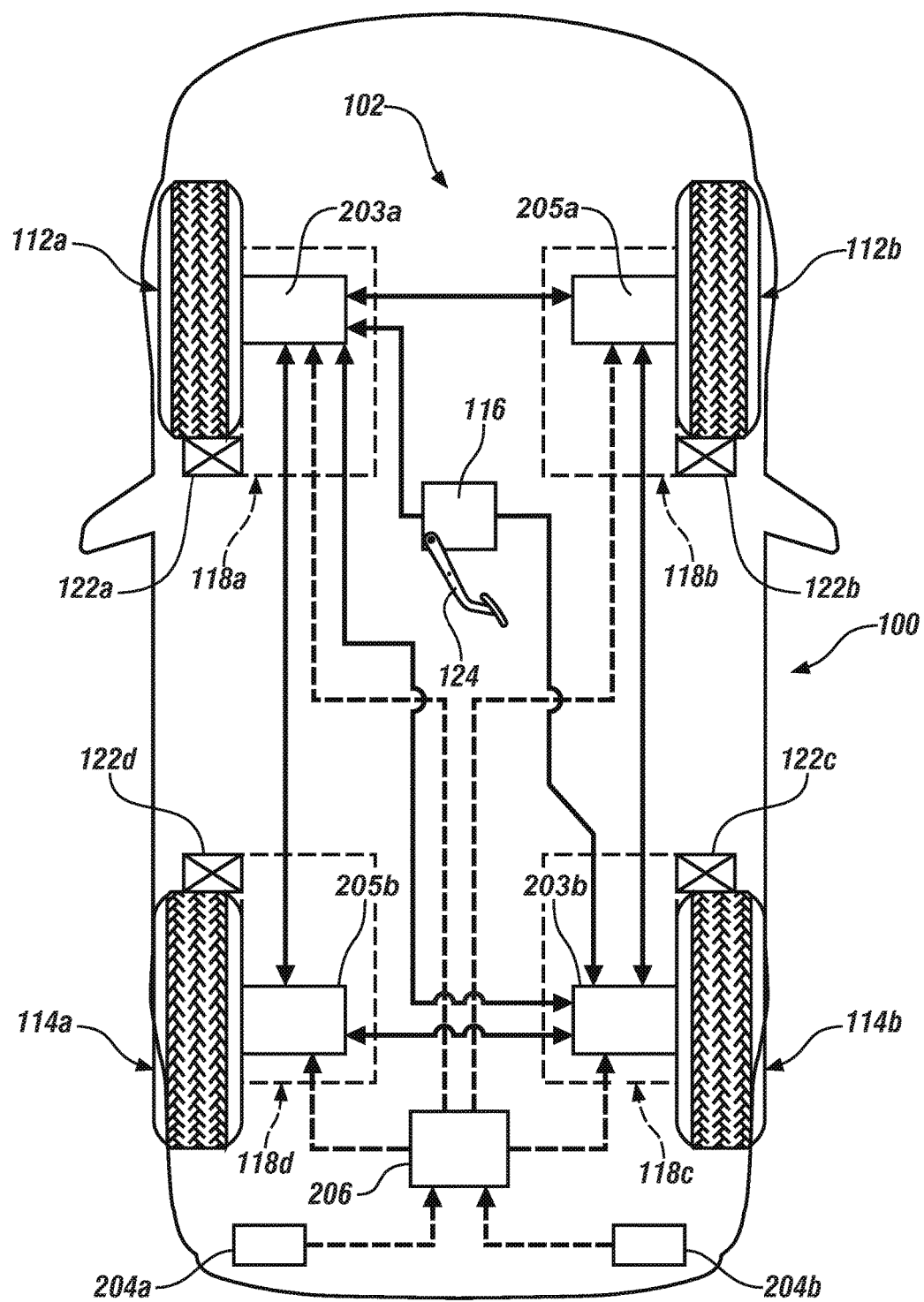
FIG. 3B is a is a schematic view of a BBW system based on a full EBS controller topology according to a non-limiting embodiment.

Turning to FIGS. 3A-3B, various embodiments of a BBW system 102 are illustrated. Referring first to FIG. 3A, and also at times referring back to FIG. 2, a BBW system 102 based on a split controller topology is illustrated according to a non-limiting embodiment. In at least one embodiment, the split controller topology includes a plurality of brake assemblies 118a-118d configured to brake a respective wheel 112a and 112b, and 114a and 114b of the vehicle 100. According to a non-limiting embodiment, the plurality of brake assemblies 118a-118d include one or more brake assemblies 118a and 118c integrated with an enhanced smart brake actuator assembly 203a and 203b, respectively, and one or more brake assemblies 118b and 118d integrated with an enhanced brake actuator assembly 205a and 205b, respectively. A first enhanced smart brake actuator assembly 203a controls braking of a first wheel 112a located at a driver side of the vehicle 100 (e.g., the front driver-side wheel 112a) and a second enhanced smart brake actuator assembly 203b controls braking of a second wheel 114b located at a passenger side of the vehicle 100 (e.g., the rear passenger-side wheel 114b).

The first enhanced brake actuator assembly 205a controls braking of a third wheel 112b located at the passenger side of the vehicle 100 (e.g., the front passenger-side wheel 112b) and a second enhanced brake actuator assembly 205b controls braking of a fourth wheel 114a located at the driver side of the vehicle 100 (e.g., the rear driver-side wheel 114a). It should be appreciated that the locations of the enhanced smart brake actuator assemblies 203a and 203b and enhanced brake actuator assemblies 205a and 205b are not limited to the locations illustrated in the drawings. For example, the locations (e.g., driver/passenger, front/rear) of the enhanced smart brake actuator assemblies 203a and 203b, and the enhanced brake actuator assemblies 205a and 205b may be interchanged or swapped without departing from the scope of the invention.

The enhanced smart brake actuator assemblies 203a and 203b include an actuator controller (element 201a. FIG. 2), an electronically controlled actuator (element 120a, FIG. 2) and an actuator driver circuit (element 202a, FIG. 2). A motor of the electronic controlled actuator 120a operates in response to a high-frequency switched high-power current output by a respective actuator driver circuit, and in turn drives the electronically controlled actuator to apply a variable (i.e., adjustable) braking force to slow down a respective wheel 112a and 114b. The actuator driver circuits may include various high-power electronic components including, but not limited to, h-bridges, heat sinks, application-specific integrated circuits (ASICs), controller area network (CAN) transceivers, or temperature or current sensors.

The enhanced brake actuator assemblies 205a and 205b operate in a similar manner to the enhanced smart brake actuator assemblies 203a and 203b discussed herein. However, the enhanced brake actuator assemblies 205a and 205b are not integrated with a local actuator controller. Therefore, the actuator driver circuits included in the enhanced brake actuator assemblies 205a and 205b are controlled using low-power command signals output by one or more actuator controllers included in the enhanced smart brake actuator assemblies 203a and 203b. That is, the actuator controllers are configured to control not only the actuator driver circuits integrated in their respective enhanced smart brake actuator assembly 203a and 203b, but are also configured to control the actuator driver circuits integrated in one or more enhanced brake actuator assemblies 205a and 205b.

The low-power command signal output from a respective actuator controller 201a, 201b may be delivered to the enhanced brake actuator assemblies 205a and 205b via a communication interface. The communication interface may include, for example, FlexRay™, Ethernet, and a low-power message-based interface e.g., a CAN bus. Because the individual actuator driver circuits are integrated in a respective brake assembly 118a-118d, the actuator driver circuit circuits may be located in close proximity to their respective electronically controlled actuator (e.g., motor or e-caliper). In this manner, the length of the high-current wires that deliver the switching high-frequency current signals (illustrated as dashed arrows) for driving a respective electronically controlled actuator may be reduced. In at least one embodiment, the actuator driver circuit may abut or be attached to a respective electronically controlled actuator so as to completely eliminate conventional high-current wires typically required to deliver switched high-frequency high-current signals.

As further illustrated in FIGS. 3A-3B, a first enhanced smart brake actuator assembly 203a is in electrical communication with a second enhanced smart brake actuator assembly 203b. In this manner, the actuator controllers integrated with a respective enhanced smart brake actuator assembly 203a and 203b may share data with each other. The shared data includes, for example, detected brake requests, and diagnostic results obtained after performing self-diagnostic tests.

The actuator controllers 201a and 201b integrated with the enhanced smart brake actuator assemblies 203a and 203b, respectively, are also capable of monitoring the state of the vehicle 100 based on inputs provided by one or more sensors. The sensors include, but are not limited to, the wheel sensors 122a and 122b, and data signals output from the pedal unit 116. The outputs of the pedal pressure sensor 126 and the pedal travel sensor 128 may be delivered to each actuator controller 201a and 201b to provide output redundancy. Based on the state of the vehicle 100, one or more of the enhanced smart brake actuator assemblies 203a and 203b may determine whether to invoke a braking event to slow down and/or stop the vehicle 100. When a braking event is determined, one or more of the enhanced smart brake actuator assemblies 203a and 203b outputs a low-power command signal that ultimately controls a braking force applied to the respective wheels 112a/112b, and 114a/114b.

The actuator driver circuits (e.g., 202a) integrated with the enhanced smart brake actuator assemblies 203a and 203b and the enhanced brake actuator assemblies 205a and 205b receive a constant high power input signal (e.g., non-switched high power input current) from one or more power sources 204a and 204b. The high power input signal may include a high power current signal ranging from approximately 0 amps to approximately 200 amps.

In response to receiving a braking event data command signal from an actuator controller 201a and 201b integrated with a respective enhanced smart brake actuator assembly 203a and 203b, each actuator driver circuit is configured to output a high-frequency switched high-power signal to a respective electro-mechanical actuator (e.g., motor). For example, a first actuator controller 201a integrated with a first enhanced smart brake actuator assembly 203a may output a first braking event data command signal to the first actuator driver circuit 202a integrated in the first enhanced smart brake actuator assembly 203a. The first actuator controller 201a may also output a second event braking data command signal to a second actuator driver circuit 202b integrated in a first enhanced brake actuator assembly 205a. In response to receiving the data command signals, the first actuator driver circuit 202a and/or the second actuator driver circuit 202b may convert the continuous high power current signal output from the first power source 204a into a high-frequency switched high-current signal which then drives an electronically controlled actuator (e.g., motor, e-caliper) included the respective brake assembly 118a and 118b.

In at least one embodiment, the high-frequency switched high-current signal is generated by a pulse width modulation (PWM) circuit included in an actuator driver circuit 202a and 202b integrated with a respective enhanced smart brake actuator assembly 203a and 203b and/or respective enhanced brake actuator assembly 205a and 205b. The high-frequency switched high-current signal may have a frequency ranging from approximately 15 kilohertz (kHz) to approximately 65 kHz, and may have a current value of approximately 0 amps to approximately 200 amps. The high-frequency switched high-current signal can drive a motor, which adjusts an e-caliper so as to apply a braking force on a respective wheel 112a/112b and 114a/114b. Although only first a section of the BBW system 102 controlled by the first enhanced smart brake actuator assembly 203a has been described, it should be appreciated that the second section of the BBW system 102 controlled by the second enhanced smart brake actuator assembly 203b may operate in a similar manner as discussed herein.

In at least one embodiment, an isolator module 206 is connected between the first and second power sources 204a and 204b, and the remaining electrical system of the BBW system 102. The isolator module 206 is configured to receive constant high power signals generated by the first and second power sources 204a and 204b. Based on the constant high power signals, the isolator module 206 generates a plurality of individual power input signals that are delivered to the actuator driver circuits integrated in the enhanced smart brake actuator assemblies 203a and 203b and the enhanced brake actuator assemblies 205a and 205b.

For example, the isolator module 206 outputs first and second constant high voltage power signals to each actuator driver circuit integrated in a respective brake assembly 118a-118d as described in detail herein. The isolator module 206 also outputs first and second low power signals that power the first and second actuator controllers 202a and 202b integrated with the enhanced smart brake actuators 203a and 203b, respectively. In at least one embodiment, the first and second enhanced smart brake actuators 203a and 203b are in electrical communication with the isolator module 206. In this manner, the first and second enhanced smart brake actuators 203a and 203b may obtain various diagnostic information including, but not limited to, short circuit events, open circuit events, and over voltage events.

As mentioned herein, the isolator module 206 may also be configured to isolate circuit faults on a signaling line circuit (SLC) loop, and is capable of limiting the number of modules or detectors that may be rendered inoperative by a circuit fault on the SLC loop. According to a non-limiting embodiment, if a circuit fault occurs such as, for example, a wire-to-wire short, the isolator module 206 may automatically create an open-circuit (disconnect) in the SLC loop so as to isolate the enhanced smart brake actuator assemblies 203a and 203b and the enhanced brake actuator assemblies 205a and 205b from the circuit fault condition. In addition, if a power source fault occurs, the isolator module 206 may disconnect the faulty power source 204a or 204b from the brake assemblies 118a-118d while maintaining the other normal operating power source(s). In this manner, the BBW system 102 according to a non-limiting embodiment provides at least one fault tolerant feature. When the circuit fault condition is removed, the isolator module 206 may automatically reconnect the isolated section of the SLC loop, e.g., reconnect the brake assemblies 118a-118d to the power source 204a or 204b.

Referring now to FIG. 3B, a BBW system 102 based on a full controller topology is illustrated according to a non-limiting embodiment. The full controller topology of FIG. 3B operates similar to the split controller topology described herein with reference to FIG. 3A. However, the full controller topology of FIG. 3B differs in that each enhanced smart brake actuator assembly 203a and 203b is in signal communication with each enhanced brake actuator assembly 205a and 205b. In this manner, any of the enhanced brake actuator assemblies 205a and 205b may be shut-off and/or overridden by any of the enhanced smart brake actuator assemblies 203a and 203b if an enhanced brake actuator assembly 205a and 205b generates unexpected or incorrect data. Accordingly, the full controller BBW topology may provide additional fault tolerance functionality.

According to at least one embodiment, the enhanced smart brake actuator assemblies 203a and 203b are configured to selectively operate in a split topology mode and a full topology mode based on monitored data. The monitored data includes, but is not limited to, diagnostic results obtained in response to self-diagnostic operations executed by the actuator controllers 202a and 202b integrated with the enhanced smart brake actuator assembly 203a and 203b, respectively. When operating in the split topology mode, for example, the first enhanced smart brake actuator assembly 203a controls the first enhanced brake actuator assembly 205a, while the second enhanced smart brake actuator assembly 203b controls the second enhanced brake actuator assembly 205b.

When operating in the full topology mode, however, either the first enhanced smart brake actuator assembly 203a or the second enhanced smart brake actuator assembly 203b controls both the first enhanced brake actuator assembly 205a and the second enhanced brake actuator assembly 205b. That is, while operating in the full topology mode, either the first enhanced smart brake actuator assembly 203a or the second enhanced smart brake actuator assembly 203b is capable of controlling each enhanced brake actuator assembly 205a and 205b.

The enhanced smart brake actuator assemblies 203a and 203b may transition into the full topology mode based on diagnostic results obtained in response to performing self-diagnostic testing. For example, the first enhanced smart brake actuator assembly 203a may perform a first self-diagnostic operation and communicate first diagnostic results to the second enhanced smart brake actuator assembly 203b. Similarly, the second enhanced smart brake actuator assembly 203b may perform its own second self-diagnostic operation and can communicate second diagnostic results to the first enhanced smart brake actuator assembly 203a. A full topology mode may then be initiated if the first diagnostic results and/or the second diagnostic results indicate an error. For example, if the second diagnostic results delivered by the second enhanced smart brake actuator assembly 203b indicate an error, the first enhanced smart brake actuator assembly 203a can command the second enhanced smart brake actuator assembly 203b to enter a stand-by mode or off-line mode, invoke the full topology mode, and in turn control all the enhanced brake actuator assemblies 205a and 205b included in the BBW system 102. In this manner, if the second enhanced smart brake actuator assembly 203b contains a fault, the BBW system 102 may still be fully operated by the first enhanced smart brake actuator assembly 203a thereby providing a fault tolerance feature.

Figure 4:
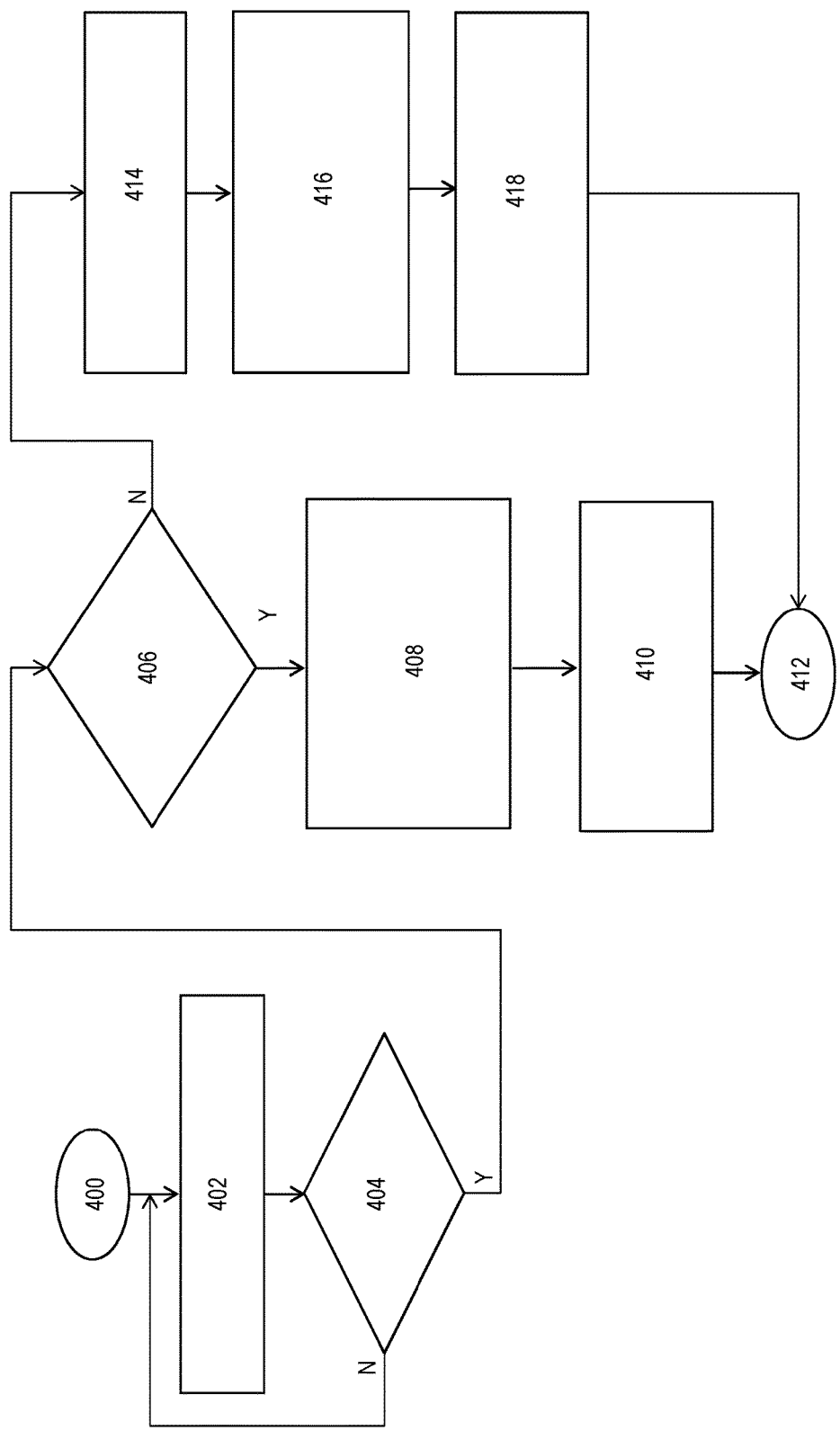
FIG. 4 is a flow diagram illustrating a method of controlling a fault tolerant BBW system according to a non-limiting embodiment.

Turning now to FIG. 4, a flow diagram illustrates a method of controlling a fault tolerant BBW system 102 according to a non-limiting embodiment. The method begins at operation 400, and at operation 402 sensor data is output to a first enhanced smart brake actuator assembly 203a and a second enhanced smart brake actuator assembly 203b. The sensor data may be output from various sensors installed on the vehicle including, but not limited to, wheel sensors 122a-122b, brake pedal sensors 126-128, and/or object detection sensor(s) 129. At operation 404, a determination is made as to whether the first enhanced smart brake actuator assembly 203a and/or the second enhanced smart brake actuator assembly 203b detects a braking event. The braking event is based on the sensor data described herein. When no braking event is detected, the method returns to operation 402 and continues monitoring the sensor data.

When at least one of the enhanced smart brake actuator assemblies 203a/203b detects a braking event, however, the first enhanced smart brake actuator assembly 203a and the second enhanced smart brake actuator assembly 203b communicate with one another so as to compare their respective detected braking event data at operation 406. For example, a first enhanced smart brake actuator assembly 230a may detect a first braking event and may request confirmation that the second enhanced smart brake actuator assembly 203b detected the same or a similar braking event. When the braking event data that is monitored and generated by the first enhanced smart brake actuator assembly 203a matches or substantially matches the braking event data monitored and generated by the second enhanced smart brake actuator assembly 203b, the method proceeds to operation 408 where a first actuator controller 201a integrated with a first enhanced smart brake actuator assembly 203a controls the first enhanced smart brake actuator assembly 203a and a first enhanced brake actuator assembly 205a. Similarly, the second actuator controller 201b integrated with a second enhanced smart brake actuator assembly 203b controls the second enhanced smart brake actuator assembly 203b and a second enhanced brake actuator assembly 205a. In this manner, two separate and individual command signals are output by the first enhanced smart brake actuator assembly 203a and the second enhanced smart brake actuator assembly 203b, respectively. At operation 410, a first electro-mechanical actuator (e.g., motor, e-caliper, etc.) adjusts a first braking torque applied to the first wheel 112a and a second electro-mechanical actuator adjusts a second braking torque applied to the second wheel 112b. In this manner, the vehicle can be slowed or stopped according to the braking event detected by the first and second enhanced smart brake actuator assemblies 203a and 203b, and the method ends at 412.

Referring back to operation 406, a scenario may occur where the braking event data monitored and generated by the first enhanced smart brake actuator assembly 203*a* does not match or substantially match the braking event data monitored and generated by the second enhanced smart brake actuator assembly 203*b*. In this case, the method proceeds to operation 414 where one of the first enhanced smart brake actuator assembly 203*a* or the second enhanced smart brake actuator assembly 203*b* outputs a data command signal to all the brake assemblies 118*a*-118*d*. Accordingly, at operation 416, the actuator driver circuits (e.g., 202*a*) integrated in the normal operating enhanced smart brake actuator assembly 203*a* and the faulty enhanced smart brake actuator assembly 203*b* may drive the associated electromechanical actuator based on the data signal output from a single enhanced smart brake actuator assembly (i.e., the normal operating enhanced smart brake actuator assembly 203*a*). This fault tolerant feature maintain operation of the vehicle brake assemblies 118*a*-118*d* in the event an enhanced smart brake actuator assembly 203*a* and 203*b* and/or a section of the BBW system 102 (including the sensors communicating with a particular enhanced smart brake actuator assembly) associated with a particular enhanced smart brake actuator assembly 203*a* and 203*b* experiences a fault. At operation 418, a first electro-mechanical actuator adjusts a first braking torque applied to the first wheel 112*a* and a second electro-mechanical actuator adjusts a second braking torque applied to the second wheel 112*b*, and the method ends at operation 412. In this manner, all electro-mechanical actuators may be controlled in response to a detected braking event even if an enhanced smart brake actuator assembly 203*a* or 203*b* does not operate according to expected conditions.

As described in detail herein, various non-limiting embodiments provide a BBW system including a data interface connecting electronic brake controllers and enhanced smart brake actuators. According to a non-limiting embodiment, a first enhanced smart brake actuator assembly included in a first brake assembly is controlled by a first actuator controller while a second enhanced smart brake actuator assembly included in a second brake assembly is controlled by a second actuator controller. Each actuator controller may output low-power data command signals to a respective actuator driver circuit (e.g., power circuit) via a communication bus such as, for example, FlexRay™, Ethernet, and a low-power message-based interface, e.g., a CAN bus. Accordingly, a flexible BBW system is provided that allows for flexible design choice, wire length reduction, and flexible braking algorithm implementation, while still employing fault tolerance into the system.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the embodiments have been described, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the disclosure not be limited to the particular embodiments disclosed, but that the disclosure will include all embodiments falling within the scope of the application.

What is claimed is:

1. A vehicle including a fault tolerant electronic brake-by-wire (BBW) system, the vehicle comprising:
   a plurality of brake assemblies configured to control braking of respective wheels of the vehicle, the plurality of brake assemblies comprising a first group of brake assemblies each integrated with an electronic enhanced brake actuator assembly, and a second group of brake assemblies each integrated with an electronic enhanced smart brake actuator assembly that includes an electronic actuator controller,
   wherein each enhanced smart brake actuator assembly electrically controls the brake assembly integrated therewith and at least one enhanced brake actuator assembly included in the first group of brake assemblies.

2. The vehicle of claim 1, wherein the second group of brake assemblies comprises:
   first and second brake assemblies integrated with first and second enhanced smart brake actuator assemblies, respectively, the first enhanced smart brake actuator assembly including a first actuator controller in signal communication with a first electronic actuator driver circuit, the first electronic actuator driver circuit in signal communication with a first electro-mechanical actuator that is configured to adjust a brake force applied to a first wheel of the vehicle, and the second enhanced smart brake actuator assembly including a second actuator controller in signal communication with a second electronic actuator driver circuit, the second electronic actuator driver circuit in signal communication with a second electro-mechanical actuator that is configured to adjust a brake force applied to a second wheel of the vehicle, and
   wherein the first group of brake assemblies comprises:
   third and fourth brake assemblies integrated with a first and second enhanced brake actuator assemblies, respectively, the first enhanced brake actuator assembly including a third electronic actuator driver circuit in signal communication with a third electro-mechanical actuator that is configured to adjust a brake force applied to a third wheel of the vehicle, and the second enhanced brake actuator assembly including a fourth electronic actuator driver circuit in signal communication with a fourth electro-mechanical actuator that is configured to adjust a brake force applied to a fourth wheel of the vehicle.

3. The vehicle of claim 2, wherein the first, second, third and fourth electronic actuator driver circuits each include a power circuit configured to output a high-frequency switched high-power current drive signal that drives the first, second, third, and fourth electro-mechanical actuators, respectively.

4. The vehicle of claim 3, wherein the first actuator controller is in electrical communication with at least one sensor to detect a braking request, and is configured to output a low-power command signal that commands at least one of the first and third electronic actuator driver circuits to output the high-frequency switched high-power current drive signal in response to the braking request.

5. The vehicle of claim 1, wherein actuator controllers included in the second group of brake assemblies generate operational data based on at least one of a torque force applied to a respective vehicle wheel and wheel speed of the respective wheel.

6. The vehicle of claim 5, wherein at least one enhanced smart brake actuator assembly diagnoses operation of at least one brake assembly included in the first and second groups based on the operational data.

7. The vehicle of claim 2, wherein the first enhanced smart brake actuator assembly controls the braking force of the first wheel located at a driver-side of the vehicle and the first enhanced brake actuator assembly controls the braking force of the third wheel located at the passenger-side of the vehicle, and wherein the second enhanced smart brake actuator assembly controls the braking force of a second wheel located at the passenger-side of the vehicle and the second enhanced smart brake actuator assembly controls the braking force of a fourth wheel located at the driver-side of the vehicle.

8. The vehicle of claim 7, wherein the enhanced smart brake actuator assemblies included in the second group are in signal communication with one another.

\* \* \* \* \*